Figure 5:
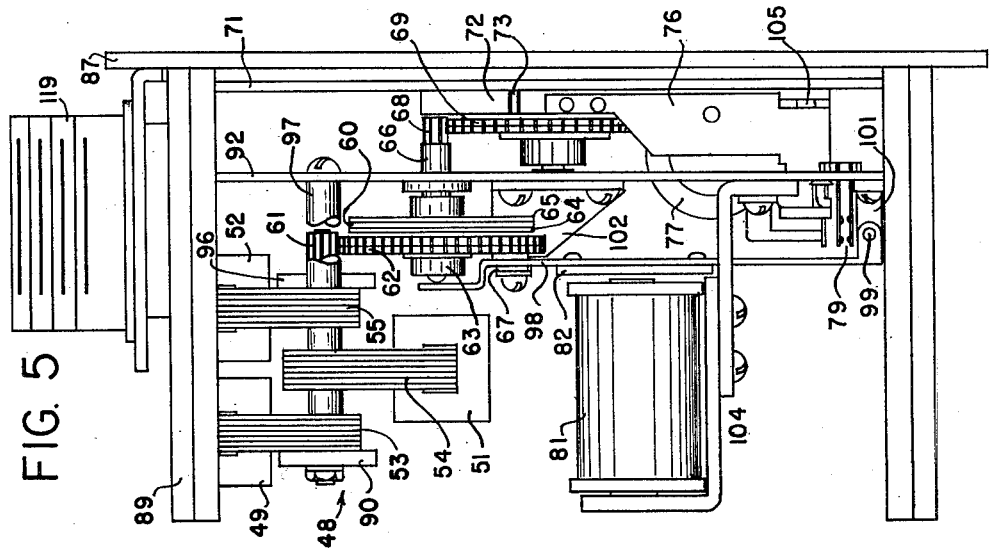

Nov. 19, 1946.  E. S. PETERSON  2,411,389
TELEMETRIC SYSTEM
Filed Sept. 11, 1943  3 Sheets-Sheet 1
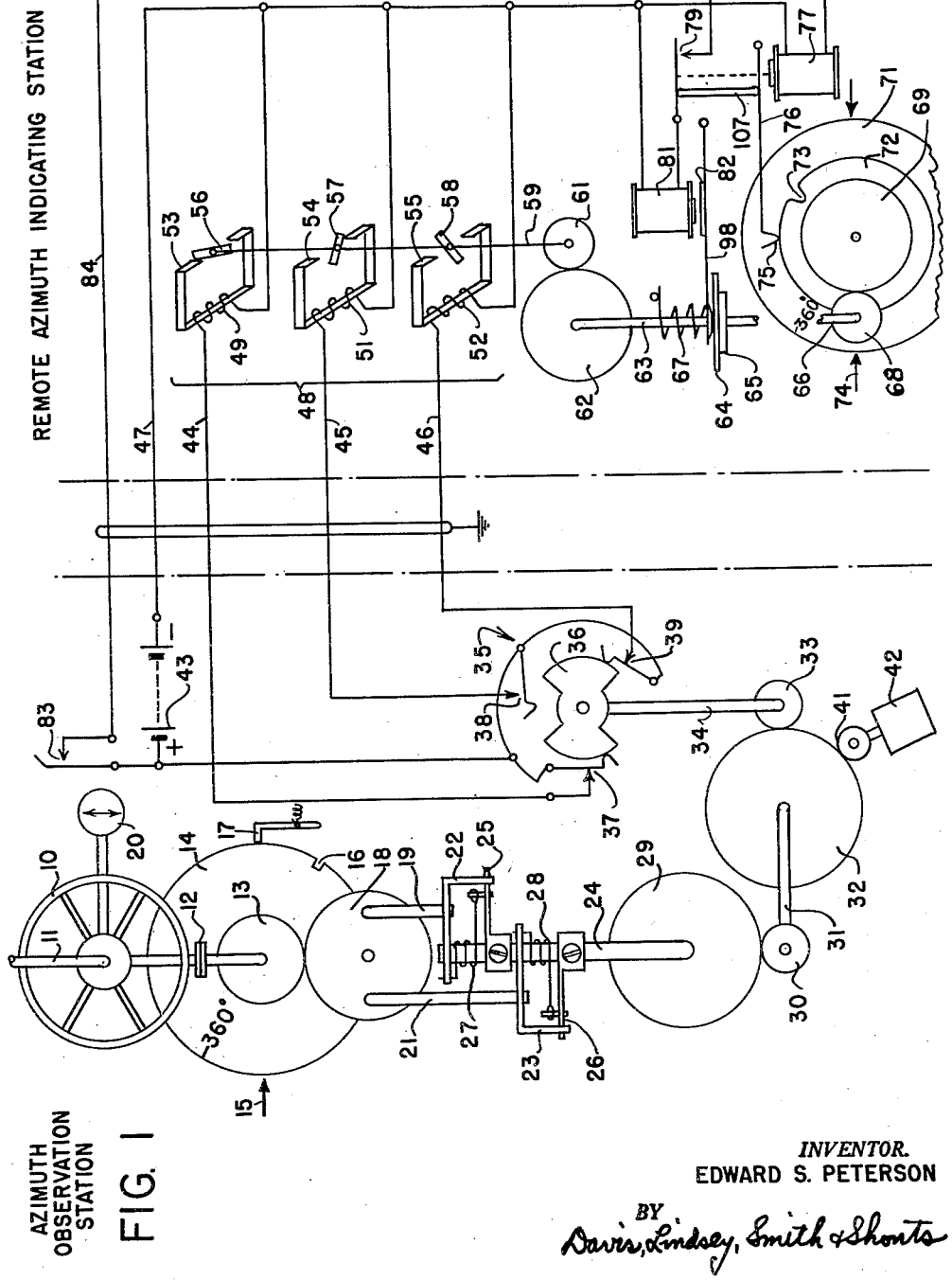
FIG. I
*INVENTOR.*
EDWARD S. PETERSON
BY
Davis, Lindsey, Smith & Shonts
ATTORNEYS

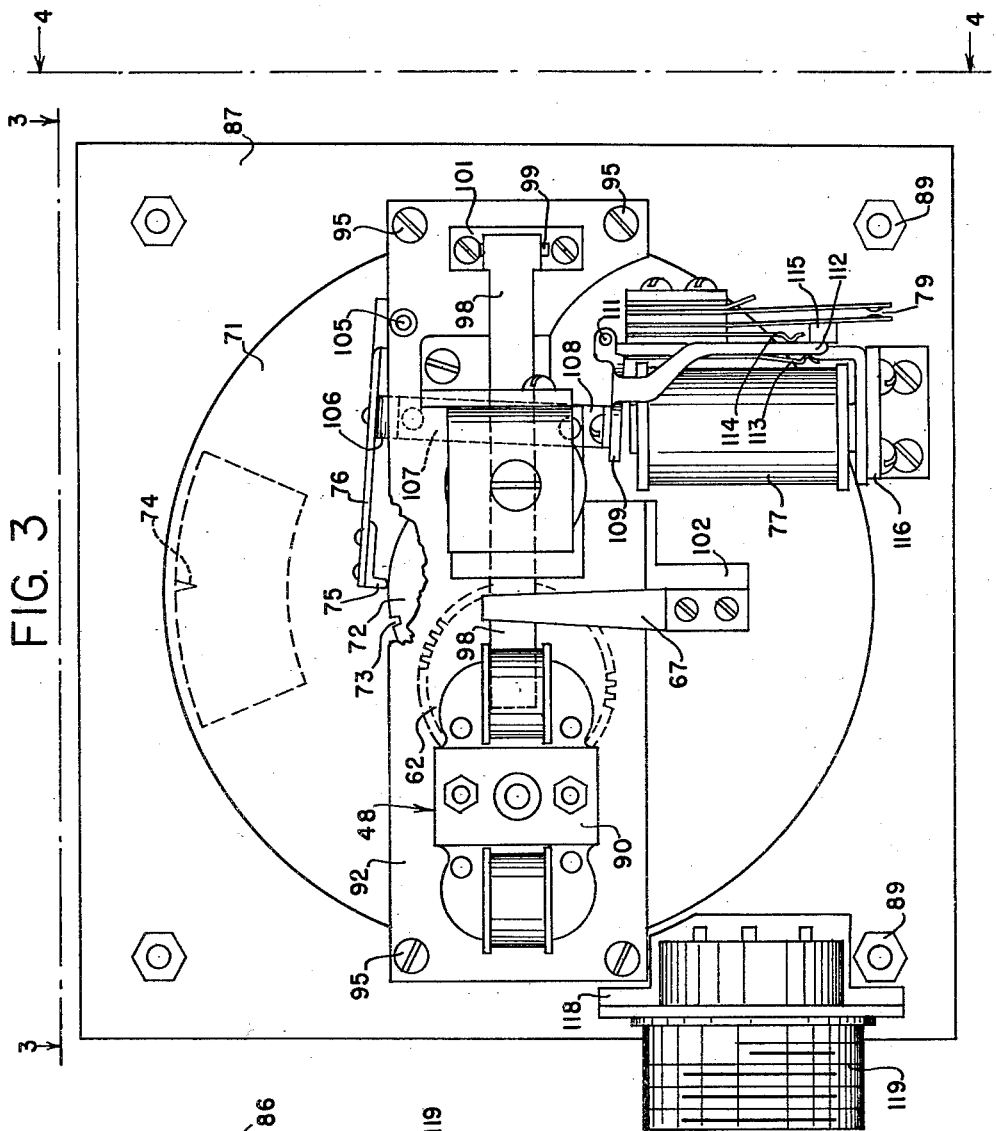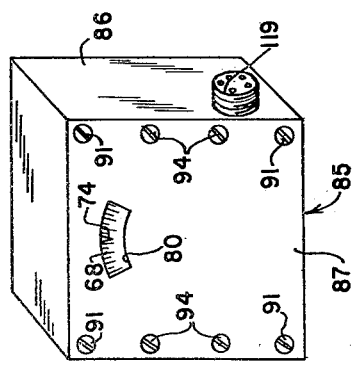

Nov. 19, 1946.  E. S. PETERSON  2,411,389
TELEMETRIC SYSTEM
Filed Sept. 11, 1943  3 Sheets-Sheet 3

INVENTOR.
EDWARD S. PETERSON
BY
Davis, Lindsey, Smith & Shonts
ATTORNEYS

Patented Nov. 19, 1946

2,411,389

UNITED STATES PATENT OFFICE 2,411,389

TELEMETRIC SYSTEM

Edward S. Peterson, Elmwood Park, Ill., assignor to Automatic Electric Laboratories, Inc., Chicago, Ill., a corporation of Delaware Application September 11, 1943, Serial No. 501,956

1 Claim. (Cl. 177—337)

This invention relates to telemetric systems and, more particularly, to a system of this type especially adapted for the remote indication of azimuth of a direction finder.

To locate a radio transmitter, a plurality of observation points is established, each using a direction finder, and the azimuth observed at each direction finder is transmitted to a central point where, by triangulation, the radio transmitter is located. To facilitate this transmission of observed azimuth from a plurality of direction finders to a central point each direction finder is provided with a telemetric system to indicate continuously at the central point the azimuth obtained by the individual direction finder. When portable direction finders are used it of course is desirable to provide remote azimuth indication with the simplest type of telemetric system which will operate with the desired degree of accuracy. It furthermore is desirable to obviate the necessity of using a power source which requires careful control or regulation of either frequency or voltage as would be the case were alternating power to be used. In setting up portable direction finders for the location of radio transmitters by triangulation, it is necessary to provide some arrangement whereby a reference point on the azimuth scale of the direction finder may be coordinated with a corresponding reference point on the scale of the remote azimuth indicating apparatus. When the reference points have been coordinated all subsequent indications at the remote point will correspond accurately with the azimuth indications at the direction finder.

It is therefore an object of this invention to provide an improved telemetric system for reproducing at a remote point the angular displacement of a member in either direction.

Another object of this invention is to provide an improved telemetric system for reproducing angular displacement of a member with the control means for coordinating a predetermined reference point on an angularly displaceable member with a reference point on a remote indicating member.

Still another object of this invention is to provide an improved telemetric receiving apparatus for indicating the angular displacement of a remotely positioned member.

Still another object of the present invention is to provide an improved telemetric receiving indicator with means for coordinating the indicator with a reference point on a remotely located angularly displaceable member.

In accordance with the present invention, each of a plurality of direction finders is provided with an azimuth scale for observing the azimuth of a radio transmitter, the location of which is to be obtained by triangulation. Each direction finder is connected by a telemetric system to the central point. This telemetric system includes an impulse transmitter at the direction finder which transmits over a plurality of channels a predetermined number of impulses corresponding to the angular displacement of the azimuth scale. At the remote azimuth indicating station these impulses are received and translated into a corresponding angular displacement of an azimuth indicating scale. At the time when portable direction finders are set up for operation it, of course, is necessary to correlate the azimuth scale of the direction finder with the azimuth indicating scale at the central point. For this purpose a control circuit is provided whereby the direction finder azimuth scale may be locked at a predetermined reference point and the remote azimuth indicating scale may then be moved to a corresponding point. This arrangement for orienting the remote azimuth indicating scale utilizes an improved receiving apparatus wherein the control circuit operates an electromagnet to stop the scale at a predetermined reference point. In response to the stopping of the remote azimuth indicating scale another electromagnet is arranged to be energized to disconnect the scale from a motor normally arranged to drive the scale.

Figure 4:
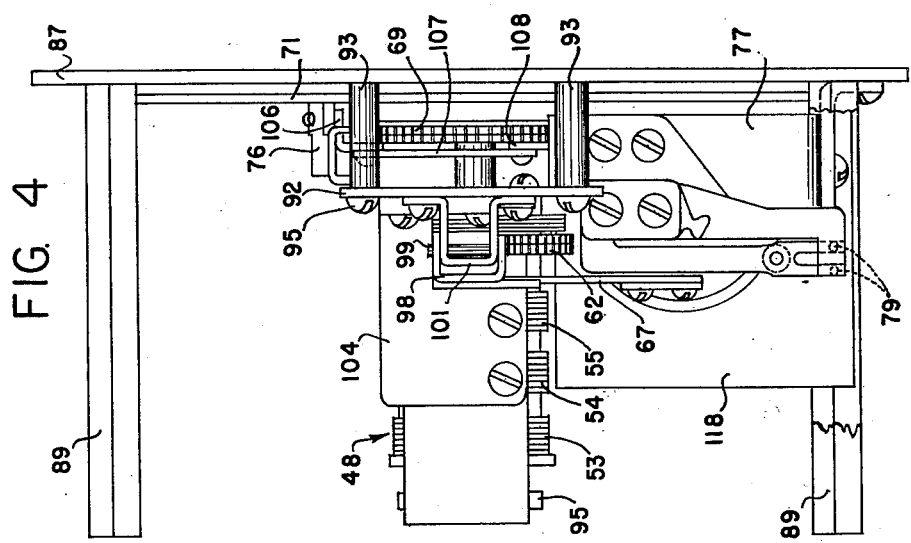

Other and further objects of the present invention will become more readily apparent by reference to the following description taken in connection with the accompanying drawings wherein Fig. 1 is a circuit diagram of a telemetric system embodying the present invention; Fig. 2 is a perspective view of a cabinet housing apparatus shown in the remaining figures wherein Figs. 3, 4 and 5 are rear, side and top views of the apparatus.

Referring to Fig. 1, there is shown a telemetric system interconnecting an azimuth observation station and a remote azimuth indicating station. The azimuth observation station includes some form of direction finding apparatus, as for example a loop antenna, the position of which may be changed by rotation of a hand wheel 10 which turns a shaft 11 which may support the loop antenna. The shaft 11 is connected through a friction clutch 12 to a gear 13 and an azimuth scale 14. The azimuth scale 14 cooperates with an indicating point 15 to show the azimuth of the loop antenna. The azimuth scale 14 is provided with a reference point in the form of a notch 16 which is arranged to be engaged by a detent lever 17 normally biased away from the azimuth dial 14. The gear 13 drives a gear 18 which is provided with two studs 19 and 21 spaced along a diameter of the gear. These studs 19 and 21 engage levers 22 and 23 which are freely rotatable upon a shaft 24. The ends of the levers 22 and 23 engage the ends of levers 25 and 26, which levers are rigidly secured to the shaft 24. A coil spring 27 interconnects the levers 22 and 25. Another spring 28, operating in the opposite direction with respect to the spring 27, interconnects the levers 23 and 26. This arrangement of levers and springs constitutes an energy storage device so that a gear 29 affixed to the shaft 24 may be rotated through an angular displacement corresponding to an angular displacement of the gear 18. If it is assumed that the gear 18 rotates in a clockwise direction the stud 21 will move the lever 23 away from the lever 26, thereby to tension the spring 28 so that it will cause the lever 26 to follow the movement of the lever 23. The lever 26, however, cannot move in excess of a predetermined rate because of the action of the governor 42 which controls the movement of the gear 29 through gears 41, 32 and 30. When the shaft 24 and the gear 29 have moved through an angular displacement equal to the angular displacement of the gear 18 the lever 26 will again engage the lever 23 whereupon further movement will cease.

If it is now assumed that the gear 18 moves in a counterclockwise direction the stud 19 will move the lever 22 so as to tension the spring 27. The tension of the spring 27 will cause the lever 25 to follow the movement of the lever 22. If the movement of the lever 22 is at a rate greater than the rate at which the shaft 24 may rotate there will be a time delay, but eventually the lever 25 will again reach the lever 22 whereupon rotation of the shaft 24 ceases. Thus it is apparent that there has been provided a follow-up mechanism whereby the gear 29 will be moved through an angular displacement equal to the angular displacement of the gear 18 but this movement will not exceed a predetermined rate of speed. The gear 29 drives another gear 30 mounted on a shaft 31 which supports a gear 32. The gear 32 engages a gear 33 mounted on a shaft 34, which at one end is provided with an impulse transmitting device 35. The impulse transmitting device comprises a cam member 36 arranged to actuate a plurality of switches 37, 38 and 39 arranged at equal angular distances about the shaft 34. In order to control or limit the maximum speed at which the shaft 34 may be rotated the gear 32 is arranged to engage a gear 41 which drives a governor 42.

The follow-up mechanism per se, schematically shown in Fig. 1, may be of the type shown, described and claimed in my copending application for Remote control systems, Serial No. 501,957, filed September 11, 1943.

The transmitting device 35 is connected in a multi-channel circuit which extends to the remote azimuth indicating station. This circuit includes a source of potential, such as a battery 43. The switches 37, 38 and 39 are each connected by suitable transmission channels, such as conductors 44, 45 and 46 to the remote azimuth indicating station. The return circuit to the source of potential 43 includes a conductor 47. At the remote azimuth indicating station there is provided an impulse-controlled motor 48 which comprises a plurality of field coils 49, 51 and 52 arranged to be energized from the conductors or transmission channels 44 to 46, respectively. These field coils 49, 51 and 52 are mounted on magnetic core or pole structures 53, 54 and 55, respectively, for cooperation with a plurality of armatures 56, 57 and 58. The various armatures 56 to 58 are supported at equal angular displacements on a shaft 59. The remaining terminals of the field coils 49, 51 and 52 are each connected to the conductor 47 so as to be included in the complete electric circuit with the impulse transmitting device 35.

The impulse responsive motor 48 has its field coils energized in succession in accordance with the completion of circuits by the impulse transmitting device 35. If, for example, the switch 37 were the only switch to be closed the field coil 49 would be the only one energized so as to cause its armature 56 to be in alignment with the pole structure 53. When two switches, such as 37 and 39, are closed at the same time, field coils 49 and 52 are both energized and for that period of time the armatures 56 and 58 will each tend to move into alignment with the respective pole structures, but because of the angular displacement therebetween neither one is in alignment with its pole structure. If it is assumed that the cam 36 of the impulse transmitter 35 is moving in a clockwise direction, it becomes apparent that shortly thereafter the switch contacts 37 will be opened, whereupon the field coil 52 will be the only one energized so that its armature 58 will be aligned with its pole structure 55. As the cam 36 continues to rotate the switch 38 will be closed to energize the field coil 51 and thereby tend to bring into alignment with its pole structure 54 its armature 57. The movement of the various armatures produces a movement of the shaft 59 in a direction corresponding to the direction of movement of the cam structure 36. The shaft 59 is connected to a gear 61 which meshes with a gear 62 mounted upon a sleeve 63.

The sleeve 63 has secured thereto a clutch plate 64 which is arranged to cooperate with a clutch plate 65 mounted upon a shaft 66. The clutch plate 64 is spring biased by a spring 67 toward the clutch plate 65 so as normally to provide a solid driving connection between the sleeve 63 and the shaft 66. The shaft 66 through a gear 68 drives a gear 69 which is secured to the remote azimuth indicating scale 71. The gear 69 and the indicating scale 71 are affixed to a circular member 72 having at a predetermined point on its periphery a notch 73. The notch 73 constitutes a reference point arranged to cause certain indicia on the scale 71 to be aligned with an indicating pointer 74. The notch 73 is arranged for selective engagement with a detent 75 mounted adjacent the free end of a lever 76 which is arranged to be actuated by a relay 77. When the lever 76 is actuated so that the detent 75 engages the notch 73 of the circular member 72, a spacing link 107 is arranged to move a switch plate to close a pair of switch contacts 79. These switch contacts 79 control the energization of a relay 81 which is arranged to attract its armature 82 to move the lever 98 which engages the spring 67 so as to free the clutch plate 64 from engagement with its cooperating clutch plate 65, thereby to render ineffective the motor 48. The relays 77 and 81 are connected in a control circuit which includes the conductor 47, the battery 43, a switch 83 located at the azimuth observation station, and a return conductor 84.

When the direction finder apparatus is set up for use the first steps taken are those to provide a coordination between the azimuth observation scale 14 and the azimuth indicating scale 71. The operator pushes against the detent 17 and turns the hand wheel 10 until the detent 17 drops into the notch 16 of the azimuth observation scale 14, whereupon "0" or 360° will register with the indicating pointer 15. While retaining the azimuth scale 14 in this position the wheel 10 is rotated, since the friction of the clutch 12 is such that this is permissible, until a compass 20 indicates that the loop antenna or direction finding apparatus is aligned with magnetic north. Thereupon the detent 17 is released and the switch 83 is closed so as to energize at the remote azimuth indicating station the magnet 77. The wheel 10 is then rotated so as to bring about one complete revolution of the azimuth observation scale 14. Rotation of the wheel 10 produces rotation of the gears 13 and 18. Dependent upon the direction of rotation of the gear 18 one of the two levers 22 or 23 will be actuated so as to bring up or tension its associated spring 27 or 28. The tension on the spring thus produces rotation of the shaft 24 at a rate of speed determined by the governor 42 which, by a gear 41, is connected to the gear 32. The levers 22 and 23 together with other associated parts including the spring members 27 and 28 constitute a follow-up mechanism in which mechanical energy is stored so that the shaft 24 is moved through an angular displacement corresponding to that of the gear 18. Due to the step-up gear arrangement between the shaft 11 and the shaft 34 which is connected to the impulse transmitter 35, a small angular displacement of the shaft 11 produces a number of revolutions of the shaft 34, whereby a plurality of impulses are transmitted over each of the channels 44, 45 and 46, the impulses of each series of impulses being displaced in time relative to the impulses in the other series due to the angular displacement of the switch contacts 37, 38 and 39 about the shaft 34. The impulse device 35 therefore transmits sufficient impulses to cause the impulse receiving motor 48 to produce rotation of the member 72, so that the detent 75 will engage the notch 73. When this occurs the magnet 81 is energized so as to release the clutch mechanism interconnecting the sleeve 63 and the shaft 66, thereby to render ineffective further action of the motor 48. The operator then continues to turn the wheel 10 until the "0" or 360° point is again in alignment with the indicating pointer 15, whereupon the switch 83 is released. Thus the coordination of the reference points on the observation station and the remote indicating station is complete.

In Fig. 2 there is shown a perspective view of a cabinet 85 which houses the remote azimuth indicating apparatus. This cabinet 85 comprises a boxlike structure 86 having a front cover 87 which is provided with an opening 88 through which is visible the dial scale 68. Figs. 3, 4 and 5 show that all of the apparatus contained in the cabinet 85 is supported from the front panel 87. The front panel 87 is provided with a plurality of mounting posts 89 which are secured in position by suitable screws 91 visible from the front of the panel 87. A mounting panel 92 is mounted parallel to the front panel 87 and some distance therefrom by a plurality of studs 93. The studs 93 are supported from the front panel by a plurality of screws 94 and at their opposite extremities a plurality of screws 95 hold in position the mounting panel 92. The motor 48 is provided with a pair of end plates 90 and 96 which, together with mounting stud members 97 secured to the mounting panel 92 retain in proper alignment position the motor pole structures 53, 54 and 55 and the motor shaft 59 which supports the armatures 56 to 58. The motor shaft 59 has a gear 61 shown in Fig. 5 which meshes with an anti-backlash or split gear 62 arranged to drive the clutch plate 64 which is arranged for cooperative relation with the clutch plate 65. If desired a clutch disk 60 may be interposed between the two clutch plates 64 and 65 to provide the required degree of friction. The clutch plate 64 is biased toward the clutch plate 65 and the clutch disk 60 by a spring 67 which bears against a lever 98 pivotally supported at 99 from a supporting bracket 101 suitably secured to the mounting panel 92. The spring 67 is supported by a bracket 102 suitably secured to the mounting panel 92. At an intermediate point thereon the lever 98 is provided with the armature 82 which cooperates with the relay 81. The relay 81 is attached to a bracket 104 also suitably secured to the mounting panel 92. The gear 68 which is attached to the shaft 66 engages another split anti-backlash gear 69 which is mounted for rotation with the circular member 72 and the dial indicating member 71. The circular member 72 is provided with a notch 73 arranged for cooperation with a detent 75 mounted on the outer extremity of an arm 76 pivotally mounted upon a pin 105 suitably secured to the mounting panel 92. The lever arm 76 is arranged to be actuated by a linkage which includes a member 106 securely fastened to the arm 76, a pivoted spacing link 107 which interconnects the member 106 with a member 108 which is secured to the armature 109 of the relay 77. The armature 109 of the relay 77 is pivoted at 111 and is provided with a rearwardly extending arm 112 positioned between two positioning springs 113 and 114 which serve to hold the armature 109 in a position so that the detent 75 at the end of the arm 76 normally does not engage the outer periphery of the circular member 72. The outer extremity of the arm 112 is also arranged to engage an insulating member 115 so as to close a pair of contacts 79. The relay 77 is supported from the front panel 87 by a suitable bracket 116. The front panel 87 also supports a bracket 118 in which there is mounted a plug connector 119 which, as may be seen from Fig. 2, is arranged to extend to the exterior of the cabinet 85. The plug connector receives the terminal at the end of a cable which includes the conductors 44 to 47 and 84.

From a description of the mode of operation of the telemetric circuit it will be remembered that when the control circuit was energized by the closure of the switch 83 the relay 77 was energized, thereby tending to pull down its armature 109 and its associated lever 76 so that the detent 75 is in engagement with the periphery of the circular member 72, so that when the notch 73 comes into engagement with the detent 75 the member 72 will be locked in this position. When the arm 76 thus moves an additional distance from that shown in Fig. 3 the armature 109 will be moved so its rearwardly extending arm 112 will operate to close the switch contacts 79, thereby to close the energizing circuit for the relay 81. The relay 81, as is apparent from Fig. 5, attracts its armature 82 thereby to pivot the lever 98 rearwardly against the action of the spring 67. Therefore the spring 67 no longer urges the clutch plate 64 into engagement with the clutch plate 65 and the clutch disk 60, so that subsequent rotation of the motor 48 may occur without any strain upon any of the gears. This clutch arrangement also provides for an accurate stopping of the indicating dial 71 without subsequently introducing an error which might occur in other arrangements due to a strain being placed upon the split gears 69 and 62. When the operator at the azimuth observation station has returned the azimuth indicator to "0" the switch 83 will be released so that both magnets 77 and 81 are deenergized. Thereafter any subsequent movement of the azimuth dial at the observation station will produce rotation of the impulse transmitter 35 to bring about a corresponding movement of angular displacement of the azimuth indicating dial 71 at the remote azimuth indicating station.

While for the purpose of disclosing the present invention a particular circuit arrangement and a particular receiving apparatus has been shown and described, it of course is to be understood that modifications may be made in the circuit arrangements and in the instrumentalities employed without departing from the spirit and scope of the invention as set forth in the appended claim.

What is claimed is:

A telemetric system for reproducing angular displacement of a member in either direction comprising a transmitting station and a receiving station, a transmission channel interconnecting said stations, an angular displaceable indicator at each of said stations, an indexing point on said indicators, means at said transmitting station controllable responsive to angular displacement of said indicator thereat for transmitting a series of impulses over said transmission channel to said receiving station, means at said receiving station operable responsive to said series of impulses for angularly displacing the said indicator thereat an amount corresponding to the angular displacement of said transmitting station indicator, a control channel interconnecting said stations for placing said indicators in alignment, means at said transmitting station for at times energizing said control channel while said transmitting station indicator is angularly displaced a predetermined amount to control said angular displacement of said receiving station indicator over said transmission channel, and means at said receiving station controlled over said energized control channel for terminating angular displacement of said receiving station indicator at said indexing point thereby to align the said indexing points of said transmitting and receiving station indicators when the said predetermined angular displacement of said transmitting station indicator has been terminated and said control channel has been deenergized.

EDWARD S. PETERSON.